June 5, 1951   W. A. FLUMERFELT   2,556,033
METHOD OF MAKING BALL AND SOCKET
JOINTS AND PARTS THEREOF
Original Filed July 31, 1944   2 Sheets-Sheet 1
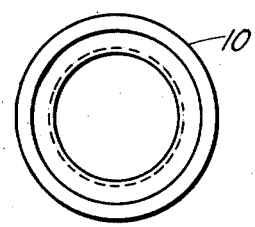
_Fig I_
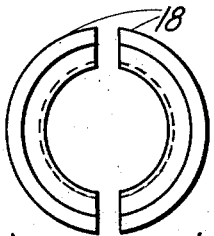
_Fig III_
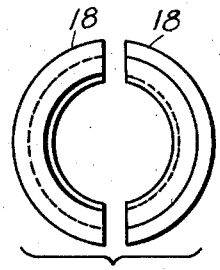
_Fig V_
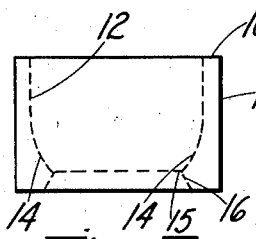
_Fig II_
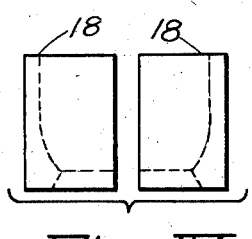
_Fig IV_
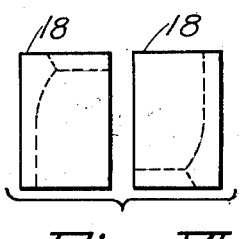
_Fig VI_
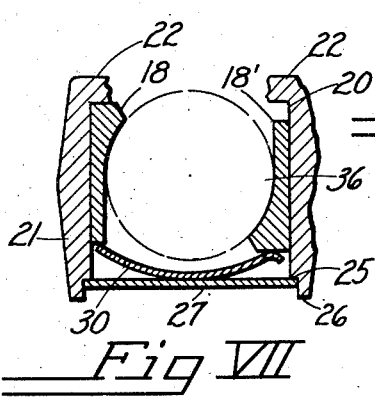
_Fig VII_
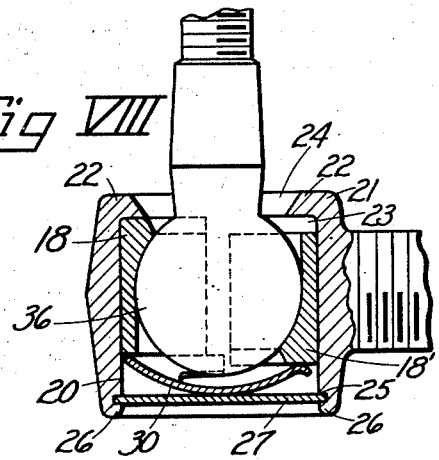
_Fig VIII_
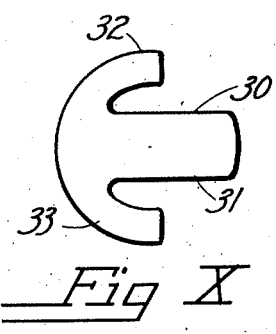
_Fig X_
_Fig IX_
INVENTOR.
WILLIAM A. FLUMERFELT
BY
Edmund B. Whitcomb
ATTORNEY June 5, 1951 — W. A. FLUMERFELT — 2,556,033
METHOD OF MAKING BALL AND SOCKET JOINTS AND PARTS THEREOF
Original Filed July 31, 1944 — 2 Sheets-Sheet 2
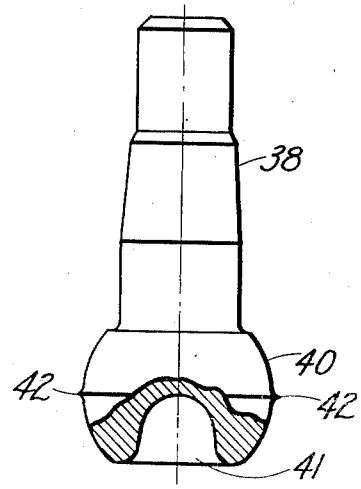
Fig XI
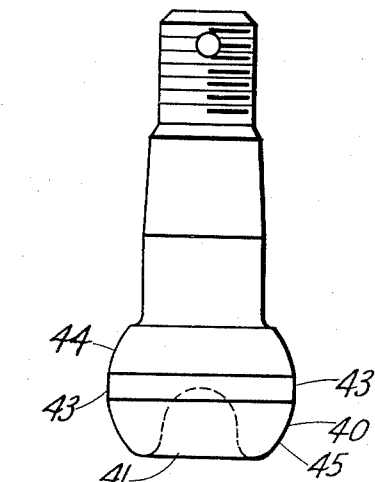
Fig XII
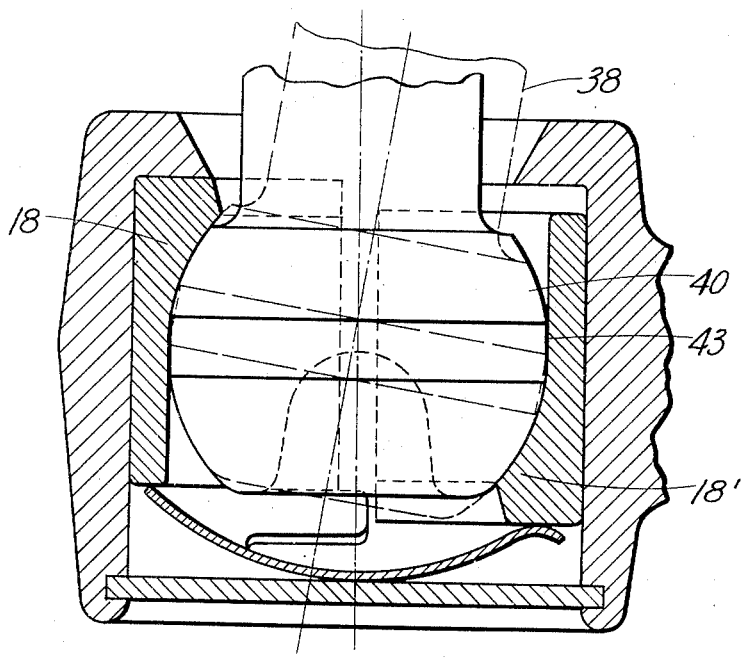
Fig XIII
INVENTOR.
WILLIAM A. FLUMERFELT
BY
Edmund B. Whitcomb
ATTORNEY Patented June 5, 1951

2,556,033

UNITED STATES PATENT OFFICE 2,556,033

METHOD OF MAKING BALL-AND-SOCKET JOINTS AND PARTS THEREOF

William A. Flumerfelt, Columbus, Ohio, assignor to The Columbus Auto Parts Company, Columbus, Ohio, a corporation of Ohio Original application July 31, 1944, Serial No. 547,453. Divided and this application January 2, 1947, Serial No. 719,833

2 Claims. (Cl. 29—152)

This invention relates to an improved method of making automatic take up types of ball and socket joints—such as joints adapted for use in tie rod assemblies for the steering mechanism of a motor vehicle and is a division of my co-pending application filed July 31, 1944, Serial No. 547,453, for Joint Construction now Patent No. 2,496,869.

The objects of the invention include a method of manufacture whereby a minimum of parts is used and a reduction in cost attained, said method also producing a simplified joint arranged for automatic compensation for wear in use. The method includes the feature of first making the separate seat units as one piece, then separating and reversing the same. In this manner efficiency in manufacture results, and a high degree of accuracy may be maintained in quantity production.

This method also includes producing novel spring urging means; the method of constructing the housing and the assembly of the joint as well as a simplification of the various cooperating parts and making the elements of the joint construction.

Further objects and advantages are within the scope of this invention and includes various other economies of manufacture and other features of merit as will be apparent from a consideration of the specification and drawing of two forms of the invention, one of which may be preferred, in which:

Figure I is a plan view of a ring from which a pair of take up ball seats are made;

Figure II is an elevational view of Figure I;

Figure III is a plan view with the rings split apart to form the separate ball seats;

Figure IV is a side elevational view of Figure III;

Figure V is a plan view of the ball seats of Figure VI reversely positioned as they are located within the socket housing;

Figure VI is a side elevational view of Figure V;

Figure VII is a diagrammatic view partly in section showing the action of the joint in operation;

Figure VIII is a vertical section of an assembled embodiment of my improved ball and socket joint;

Figure IX is a side elevational view of the improved spring member used in my assembly;

Figure X is a plan view of the spring of Figure IX;

Figure XI is an elevation partly in section of a modified form of ball and ball stud involved in modification of the present method;

Figure XII is an elevational view similar to Figure IX showing a further step in the process of manufacturing;

Figure XIII is a sectional illustration of the assembled joint of the modified embodiment illustrated in Figures XI and XII.

In the method of manufacture of my present invention, I provide a ring 10 illustrated in Figure I, which is either screw machined in the form shown, or cold coin pressed to form the shape illustrated in dotted lines (section) in Figure II and in plan in Figure I. It will be noted that this ring 10 has an inside cylindrical bore extending from the top down to less than half the distance of the length of the ring indicated at 12 while the lower part is arranged to provide spherically shaped ball seating surfaces 14 joining the bore 12 as shown and spaced from the bottom end of the ring as at 15. This lower internal bore or section 15 is outwardly flared as shown at 16.

This ring 10 is then cut in two longitudinally, as shown in Figures III and IV, the halves thereby forming the two duplicate unitary ball seats and take up members 18, which in Figures V and VI are shown in reversed location or with transposed ends one in relation to the other, as this illustrates the manner in which they are assembled in the joint. These members 18 are not "lefts" and "rights" but each member 18 may be used with any other member 18. It will be noted that the ring 10 has a cylindrically shaped outer surface, illustrated at 17 corresponding to the size of and adapted to fit the bore 20 of the housing 21. This bore 20 of the socket housing 21 is cylindrical in shape terminating short of the upper end of the housing 21 leaving a retaining inwardly extending flange 22 at one end resulting in a smaller opening 24 for reception of the ball stud. The housing 21 is also provided with a lower edge 25 and flange 26 to form integral washer retaining means for the spring retainer 27. The flange 26 is turned or forced over the plate 27 after assembly of the joint.

My invention also includes the use of the leaf type spring 30, Figures IX and X, which has the main spring portion 31 and the arcuate formed and true design shaped ears 32 and 33, the latter adapted when the joint is assembled as shown in Figures VII and VIII to contact the downwardly extending lower edge or front face of the rim of the ball seat 18, this arrangement preventing the spring from rotating out of correct position in use.

In assembling the joint as shown in Figures VII and VIII it will be noted that the reversely arranged halves of the ring 10, constituting the ball seat take up members 18 and 18' (for example) are positioned so that the top edge of seat 18 contacts the underside of the overhanging flange 22 of the housing 21, while a space 23 is provided between the top end of the other ball seat and take up member 18' and flange 22. The spring 30 held in place by the spring retaining washer 27, bears against the lower end of each of said ball seats as shown and constantly urges both the seats 18 and 18' upwardly (in the particular position illustrated in Figures VII and VIII). Pressure from seat 18' acts against ball 36 by the force of spring 30, and ball 36 is thereby forced into contact with the thick end or wedge shaped bearing portion of seat 18 which is consequently held in contact with the underside of housing flange 22. The spring retaining washer 27 upon which spring 30 rests is securely held in position by turning over flange 26 on the retainer 27 to firmly hold all parts of the joint in assembled position.

The pressure of the spring 30, its action, as well as the position of the ball and seats in the assembled ball joint is more fully illustrated diagrammatically in Figure VII. Here it will be seen that the main line of pressure is at an angle and comes above and below the center line of the ball, all as fully described in my copending application above referred to.

In the modification shown in Figures XI, XII, and XIII, I provide a method of making a type of stud and ball in the combination which further permits an overall reduction in cost in manufacturing the joint. In this embodiment, instead of being of a standard type such as the ball 36 of Figures I through X, the ball stud 38 has a ball 40 having a cavity 41 in the end, as shown, to save material, and is made by a forging, which, as illustrated in Figure XI, leaves a flashing or rib 42 around the ball, which rib is removed before the ball stud is assembled in a joint. In the present invention, to remove the rib 42 I use a straight edge or straight surface tool so that trimming the flash 42 in the least expensive manner results in an annular "flat" or cylindrical portion at 43 illustrated in Figure XII. I have found, however, that in the one inch size balls, if this "flat" surface does not exceed 3/64 inch in longitudinal width, measured axially of the ball stud, and does not otherwise modify the spherical shape of the other portions of the ball 40, which has the spherical bearing surfaces 44 and 45, I can satisfactorily use this type of ball stud in the assembly as illustrated in Figure XIII, thus reducing overall costs. In this manner it will be seen that it is unnecessary to accurately, spherically machine the portion where the rib 42 is removed, since the ball 40 may have the annular "flat" 43 thereon without producing, in effect, an out-of-round ball.

In Figure XIII, I have illustrated the action of the assembly using the type of ball stud illustrated in Figures XI and XII. Here, it will be noted that the spherical bearing portions of the ball 40 properly seat in the ball seats 18 and 18' made, constructed, and assembled as in the embodiment of Figures I through X. In action I have found that the maximum movement still provides sufficient bearing surface without bringing the "flat" surface 43 onto the main or necessary working surfaces of the ball seats, as long as the width of the flat portion 43 is kept down to the minimum mentioned above in the size of ball and ball stud having an inch spherical diameter plus or minus the usual tolerances. In other words, the ball stud 38, in the embodiment illustrated in Figure XIII, may move to a position as shown by dotted lines to contact or nearly contact the edge of the flange 22 of the housing 21 before a sufficient portion of the flat 43 encroaches upon the spherical bearing portion of the ball seats 18 and 18'. By making these ball seats in the manner illustrated above in Figures I to VI, and assemblying in reversed position, it will be seen that the working surfaces, as illustrated in Figure XIII are located diammetrically opposite above and below the median plane of the ball as in the other embodiment, which feature particularly cooperates with the use of the ball 40 of this embodiment. The full and dotted lines shown in Figure XIII illustrate the action of this embodiment and show the limit of the tilt which is suggested by the dotted line position.

It is apparent that, within the scope of the invention, modifications and different arrangements may be made other than is herein disclosed, and the present disclosure is illustrative merely, the invention comprehending all variations thereof.

What I claim is:

1. A method of making a ball stud and socket joint including separately providing a housing member; forming a cylindrical opening extending from one end to a plane adjacent the other end thereof, thereby forming an inturned flange on that end of the housing; forming a circular ring member having an outside diameter substantially equal to the diameter of said cylindrical housing opening and adapted to fit therein; providing said ring with a cylindrical portion on the inside thereof extending from one end inwardly to adjacent the central portion thereof and of a size slightly larger than the diameter of the ball of said joint; forming a spherically shaped seat portion on the inside of said ring terminating at said last mentioned inner cylindrical portion and spaced from the other end of said ring; forming an outwardly flared conically shaped opening between the other end of said ring and said inner spherically shaped portion, the conically shaped opening being of less diameter than the diameter of said ball and greater than the diameter of the stud of said ball and socket joint, cutting said ring member longitudinally into two separate substantially identical parts to form a pair of reversible individual ball seats, inserting said reversely arranged individual seats and a ball and stud in said housing; locating a resilient member in contact with the ends of said individual seat members and closing the end of said housing opposite said inturned flange to assemble a joint and retain a resilient member therein against the ends of said reversely arranged individual seats.

2. A method of making a ball stud and socket joint, including providing a housing member; forming a cavity with an opening in said housing and providing the open end of said housing with an inturned flange; forming an annular shaped member having an outside configuration corresponding to and adapted to fit into the cavity in said housing; providing said annular member with a spherically-shaped seat portion on the inside thereof conforming to the ball of said ball and stud part of said joint; cutting said annular member longitudinally into two substantially identical parts to form a pair of reversible individual ball seats; reversing one ball seat end for end with respect to another; assembling a ball between the reversely arranged seats, said ball having a stud extending therefrom; inserting the assembled seats and ball in said cavity so that one of said seats engages said flange and with the stud extending through said opening; inserting and retaining a resilient means in said cavity whereby the resilient means normally urges said seats toward said flange.

WILLIAM A. FLUMERFELT.

REFERENCES CITED

The following references are of record in the file of this patent:

UNITED STATES PATENTS

| Number | Name | Date |
|---|---|---|
| 1,498,748 | Pierce, Jr. | June 24, 1924 |
| 1,803,803 | Kaufman | May 5, 1931 |
| 1,843,356 | Carlough | Feb. 2, 1932 |
| 1,891,804 | Flumerfelt | Dec. 20, 1932 |
| 2,265,839 | Hufferd et al. | Dec. 9, 1941 |
| 2,361,024 | Graham | Oct. 24, 1944 |